Aug. 4, 1953  R. W. KLING  2,647,630
ADJUSTABLE SHAKER SCREEN DRIVE MECHANISM
Filed July 28, 1950  3 Sheets-Sheet 2

INVENTOR.
Robert W. Kling
BY Albert G. McCaleb
Attorney

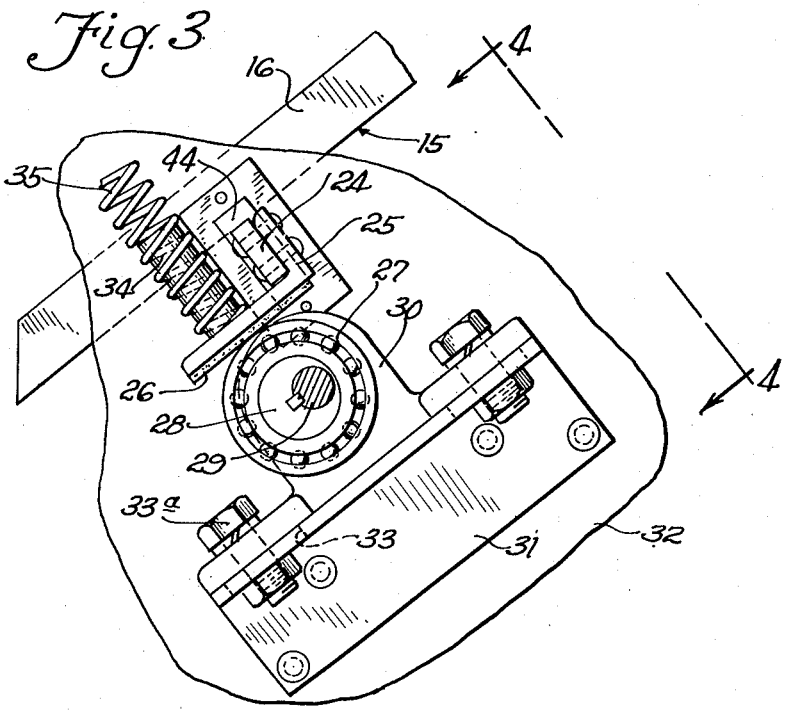
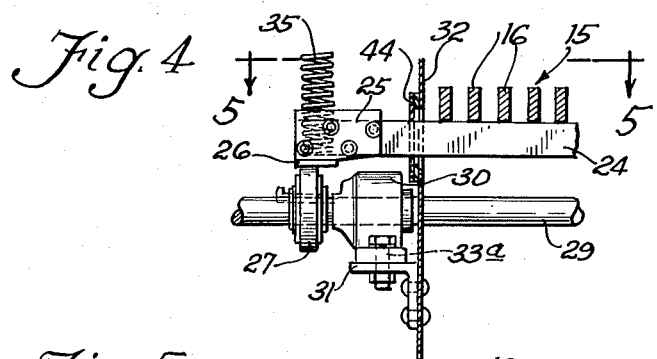
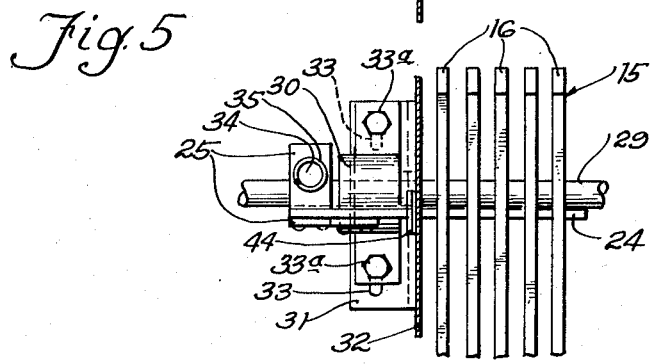

Patented Aug. 4, 1953

2,647,630

UNITED STATES PATENT OFFICE 2,647,630

ADJUSTABLE SHAKER SCREEN DRIVE MECHANISM

Robert W. Kling, Chicago, Ill., assignor to Athey Products Corporation, Chicago, Ill., a corporation of Illinois Application July 28, 1950, Serial No. 176,337

1 Claim. (Cl. 209—348)

This invention relates to an adjustable drive mechanism for shaker screens of the type in which the screen is subjected to vibratory movements for sifting any kind of material.

In one form of machine with which my adjustable drive mechanism has been used, a grate or screen comprising a plurality of parallel spaced shaker bars is pivotally mounted for permitting vertical vibration, and is actuated for substantial angular movement by eccentrics driven through an endless belt, chain or the like. With such an arrangement, it is important that means be provided for tightening the belt from time to time, as may be necessary. It is accordingly one of the objects of my invention to provide a construction for a shaker screen drive mechanism, and by the use of which the necessary adjustments can be effected without injuriously disturbing the operation of the means by which power is transmitted to the screen for vibrating it.

It is another object of my invention to provide an improved form of eccentric and cooperating parts for vibrating a shaker screen or the like, comprising preferably a combination cushioning and wearplate member for translating motion from the eccentric in a manner calculated to keep the wear and tear on the mechanism at a minimum. My improved shaker drive mechanism also includes durable anti-friction devices which are utilized in a unique manner as wear resistant parts in connection with the eccentrics, thereby contributing to long life, as well as making the operation as smooth and easy as possible consistent with the desired vibratory action. The wearplate member preferably has a friction facing for preventing slippage between that wearplate member and its cooperating motion translating part, thereby to minimize wear on vital parts of the mechanism.

In another aspect, my invention has within its purview the provision of an adjustable shaker drive mechanism embodying driving and driven parts connected for actuation of the driven parts in a manner avoiding positive connections between those parts and such that the driving parts are independently adjustable and the transmission of detrimental impact forces between the parts limited.

Other objects and advantages of the invention will be apparent from the following description and the accompanying drawings, in which similar reference characters indicate similar parts throughout the several views.

In the three sheets of drawings:

Fig. 3 is an enlarged detail view of parts of the mechanism shown in Figs. 1 and 2;

Fig. 4 is a sectional view taken substantially at the line 4—4 in Fig. 3; and

Fig. 5 is a sectional view taken substantially at the line 5—5 in Fig. 4.

While the shaker screen drive mechanism disclosed herein is adapted to use with various types and classes of apparatus, it is shown, by way of example, in association with a crusher unit. Considering the general structure and arrangement of the exemplary embodiment of the invention which is disclosed in the accompanying drawings for illustrative purposes, 10 indicates the housing of a breaker or crusher of any approved type which is adapted to receive relatively coarse pieces of stone, concrete, or other material to be crushed as it is fed downwardly from a hopper 11. A heavy shaft 12, forming a part of the breaker unit, is driven in clockwise direction as viewed in Fig. 1, by power from any suitable source. The machine of which a portion only is shown by my drawings is of the same type as that disclosed in the application of Raymore D. McDonald, Serial No. 69,492, filed on January 6, 1949, now Pat. 2,567,389.

Figure 1:
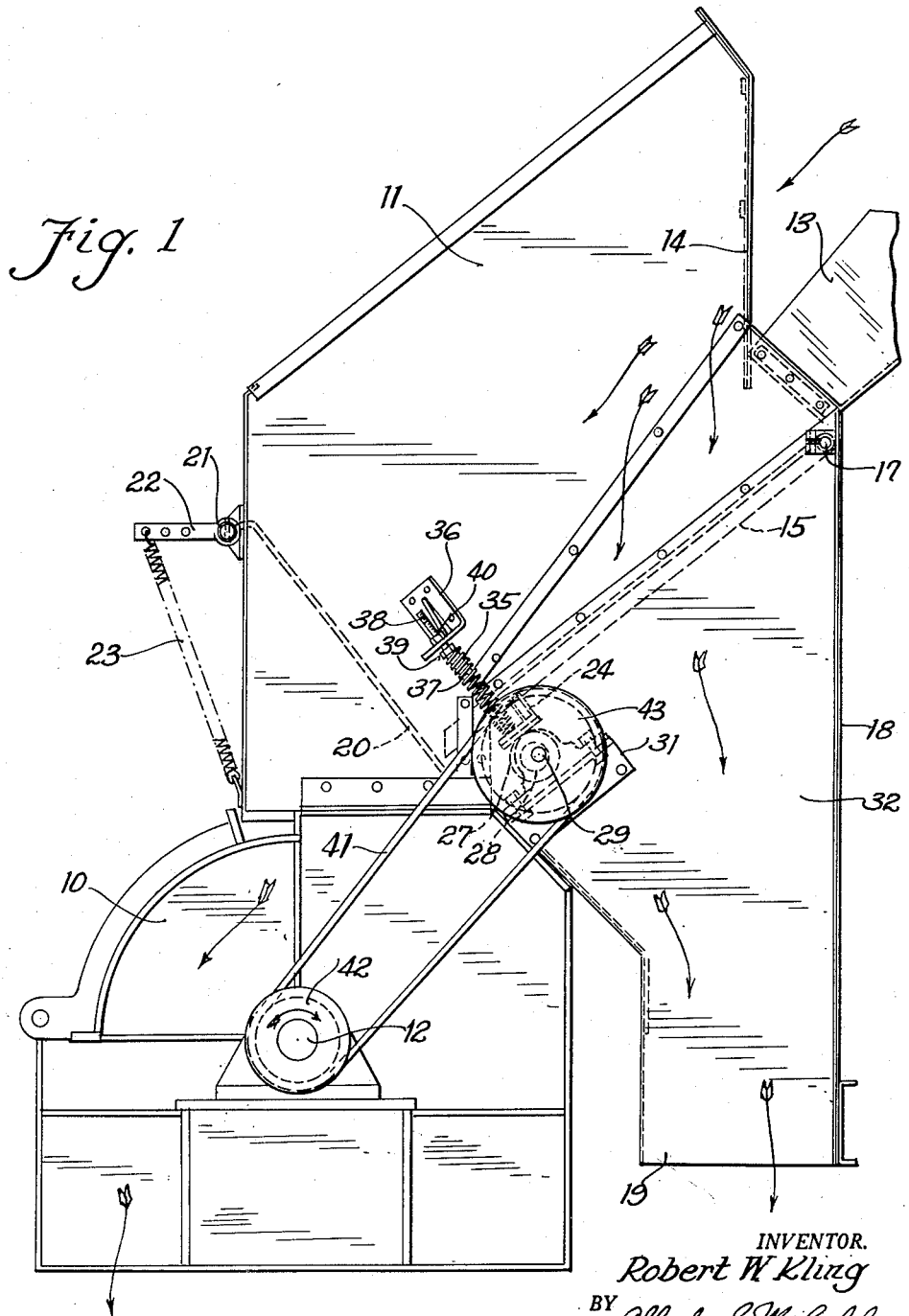
Fig. 1 is a side elevational view of a portion of a portable breaker unit embodying my improved shaker screen drive mechanism.
Figure 2:
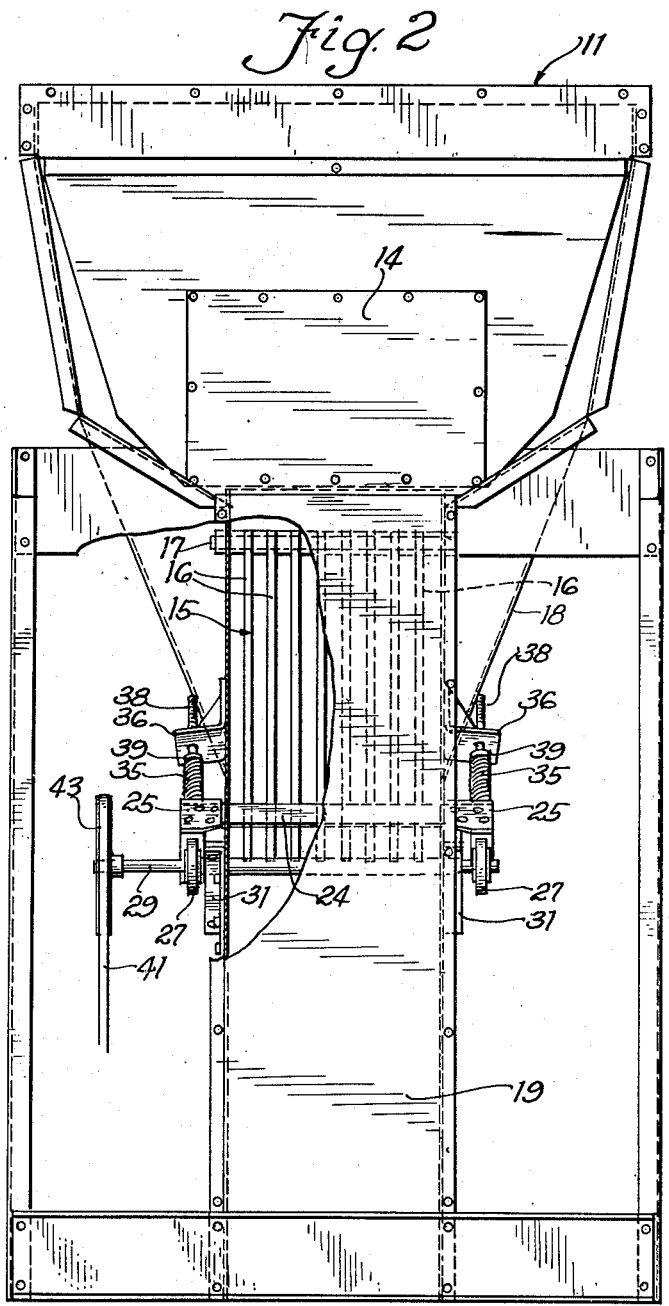
Fig. 2 is a view of the apparatus of Fig. 1 as seen from the right in the latter figure, with some of the parts broken away or shown in section.

As shown in Fig. 1, the hopper 11 is provided with an apron 13 in position to underlie the delivery end of a conveyor of any suitable construction (not shown) by which the materials to be sifted and treated are delivered to the hopper. At the inlet opening of the hopper, which is at the right near the upper end in Fig. 1, a curtain 14 of rubber or other suitable material is hung so as to yield toward the left in said figure for deflecting the blocks or chunks of concrete or other materials into the hopper from the end of the conveyor, together with more finely divided particles of material.

In the machine disclosed, a grate or screen 15, comprising a series of shaker bars 16 is pivotally mounted on a cross bar 17 and is supported in oblique position with said bars 16 extending downwardly and toward the crusher 10 from a position below the opening of the hopper 11 at which the material is admitted to the hopper. When the material enters the hopper, it falls directly upon the grate 15 so that the finer particles pass downwardly through a housing 18 and an outlet chute 19 for deposit on the roadway or the like without going through the crusher. The larger particles of the material entering the hopper slide downwardly along the shaker bars 16, from the lower ends of which such larger particles are delivered to the crusher; such material, after being crushed, passing downwardly to the roadway from the bottom of the crusher housing.

A series of bars 20 are provided in laterally spaced relationship to each other above the crusher; such bars being individually pivoted on a cross bar 21, and each of said bars 20 being provided with an arm 22 connected by a coiled spring 23 with a portion of the housing, so as normally to support said bars yieldingly in oblique position extending downwardly and across the passage into the top of the crusher. The arrangement is such that any one or more of such bars 20 are adapted to move downwardly to permit coarse materials to pass, after which the arms are brought back to normal position for preventing any stones or the like from being thrown upwardly again into the hopper 11 under the influence of the forces acting on such stones in the crusher.

In my preferred arrangement, the lower end of the grate or screen 15 is supported by a cross bar 24 extending across and underneath the bars 16. At its ends, the cross bar 24 is provided with angle bar members 25, provided on their bottom faces with combination cushioning and wear resisting plates 26 of rubber, leather or other suitable material, which are engaged and supported by the outer races of ball bearings 27 which are carried by eccentrics 28 mounted on and keyed to opposite end portions of a shaft 29. The shaft 29 is mounted in pillow blocks 30 which, in turn, are mounted on angle bar brackets 31 carried by walls 32 of the housing 18. As clearly shown in Figs. 3 and 5, the connections between the pillow blocks 30 and the angle bar brackets 31 comprise slots 33 through which securing bolts 33a extend so as to make the pillow blocks and the shaft 29 readily adjustable laterally of the shaft with respect to the housing wall 32.

Each of the angle bar brackets 25 is provided with a pin 34 projecting upwardly therefrom for mounting a coiled spring 35 thereon; the upper ends of which springs 35 abut angle brackets 36 fixedly secured to side wall portions of the hopper 11. The springs 35 are loosely connected with the brackets 36 by means of pins 37 inserted in the upper ends of the springs and having threaded extensions 38 projecting through the brackets, with nuts 39 and 40 thereon at opposite faces of the outwardly extending portions of said brackets 36.

As shown in Fig. 1, the shaft 29 is drivingly connected with the shaft 12 by an endless belt 41 which is carried by pulleys 42 and 43 secured to shafts 12 and 29 respectively, so as to cause the shaft 29 to be driven from the crusher.

In operation a stream of material is delivered into the hopper 11 past the curtain 14. With the eccentrics 28 being rotated constantly by the shaft 29, so as to give the bearings 27 movements laterally of the shaft 29, the grate or screen 15 is vibrated vertically, so as to cause the finer particles of the materials delivered to the hopper to pass downwardly through the screen and through the chute 19. The larger pieces of material, such as chunks of concrete or asphalt composition, are caused to move downwardly on the screen bars 16 for delivery to the crusher; the material of such chunks or large pieces being delivered from the crusher after breakage. In such operation of the mechanism, the screen 15 is raised by the direct action of the eccentrics 28, and is brought back to its lowered position by the action of the springs 35.

When it becomes necessary to regulate the tension of the belt 41 during initial adjustment or after a period of operation, the bolts 33a are loosened so as to permit the pillow blocks 30 to be moved along the brackets 31 to an adjusted position, after which the bolts are again tightened for normal operation. Upon the movement of the pillow blocks 30 along the angle bar brackets 31 for adjusting the tension of the belt 41, the points of engagement of the bearings 27 with the combination cushioning and wear resisting plate members 26 are shifted slightly, but without any change in the effectiveness of the support for the screen 15, or in the effectiveness of the apparatus for vibrating the screen. By the provision of the anti-friction bearings 27 between the cushioning and wear-resisting members 26 on the angle bars 25 and the eccentrics 28, the action is made as smooth and easy as possible, with a minimum of wear on the bearing face members 26. With such bearing face members 26 made of rubber or leather or otherwise provided with frictional surfaces, the outer races of the bearings 27 are prevented from slippage with respect to such bearing faces, so that the wear is taken by the anti-friction ball bearings between the angle bars and the eccentrics. The outer races of the bearing 27 may be considered oscillating rollers, for they roll back and forth on the friction members 26 while reciprocating in response to rotation of the eccentrics 28.

On the end portions of the cross bar 24, I have provided rubber sealing plates 44 for keeping the openings through the wall 32 effectively closed about the cross bar as it is moved for vibrating the screen 15.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is:

In combination, a screen having a pivotal mounting at one end thereof, a housing containing the screen and having side walls, a shaft extending across the screen and through and beyond the walls near the end of the screen opposite that which is pivotally mounted, eccentrics secured to the shaft beyond the side walls, rings surrounding the eccentrics, anti-friction means placed between the eccentrics and the rings to make the rings reciprocate in response to rotation of the eccentrics and yet to free the rings from such rotation, a cross bar secured to the screen and extending across it and through the side walls at a position near the shaft, angle members positioned beyond the side walls and each having one leg attached to an end portion of the cross bar and the other leg generally parallel to the face of the screen and engaged by one of the said rings, bearings for the shaft placed between the eccentrics and the walls and secured to said walls through supporting brackets for adjustment along the supporting brackets and relative to the said other legs of the angle members, whereby a belt driving the shaft may be tightened without moving the rings away from the angle members, projections on the said other legs of the angle members on the faces opposite those engaged by the rings, brackets secured to the outside of the housing walls having portions in spaced and opposed relationship to said other legs and said projections, and springs fitting over the projections and acting between the brackets and the said other legs of the angle members to maintain the angle members in contact with the rings.

ROBERT W. KLING.

References Cited in the file of this patent

UNITED STATES PATENTS

| Number | Name | Date |
|---|---|---|
| 900,993 | Fanton | Oct. 13, 1908 |
| 1,207,262 | Alwart | Dec. 5, 1916 |
| 1,432,738 | Alwart | Oct. 24, 1922 |
| 1,457,810 | Alwart | June 5, 1923 |
| 1,499,892 | Sturtevant et al. | July 1, 1924 |
| 1,625,299 | Costello | Apr. 19, 1927 |
| 1,649,883 | Woodward | Nov. 22, 1927 |
| 1,854,018 | Carlberg | Apr. 12, 1932 |
| 1,953,270 | Slater | Apr. 3, 1934 |
| 2,112,886 | Greenawalt | Apr. 5, 1938 |
| 2,256,358 | Smith | Sept. 16, 1941 |
| 2,302,193 | Davies | Nov. 17, 1942 |

FOREIGN PATENTS

| Number | Country | Date |
|---|---|---|
| 302,813 | Great Britain | Dec. 27, 1928 |